May 22, 1956  V. D. ROOSA  2,746,442
METERING VALVE FOR FUEL PUMP
Filed April 4, 1952  2 Sheets-Sheet 1

INVENTOR.
VERNON D. ROOSA
BY
Lindsey and Prutzman
ATTORNEYS

May 22, 1956 V. D. ROOSA 2,746,442
METERING VALVE FOR FUEL PUMP
Filed April 4, 1952 2 Sheets-Sheet 2

INVENTOR.
VERNON D. ROOSA
BY
Lindsey and Prutzman
ATTORNEYS

2,746,442

METERING VALVE FOR FUEL PUMP

Vernon D. Roosa, West Hartford, Conn.

Application April 4, 1952, Serial No. 280,575

16 Claims. (Cl. 123—139)

The present invention relates to fuel pumps and, more particularly, to an improved metering valve particularly adapted for use with fuel pumps.

An object of the present invention is to provide a metering valve which is responsive to the pressure of the fluid being metered whereby the rate of flow may be maintained constant at a selected setting of the valve despite variations in the fluid pressure.

Another object of the invention is to provide damping means for a valve of the type referred to which is of simple and economical design and which will effectively overcome any tendency of the valve to fluctuate or flutter due to momentary variations in fluid pressure.

A further object of the invention is to provide improved setting means for the valve whereby the effective orifice of the valve may be easily and effectively controlled.

Another object of the invention is to provide auxiliary setting means to limit operation of the first setting means and provide a positive shutoff when desired.

Other objects will be in part obvious and in part pointed out more in detail hereinafter.

The invention accordingly consists in the features of construction, combination of elements and arrangement of parts which will be exemplified in the construction set forth and the scope of the application of which will be indicated in the appended claims.

Figure 1:
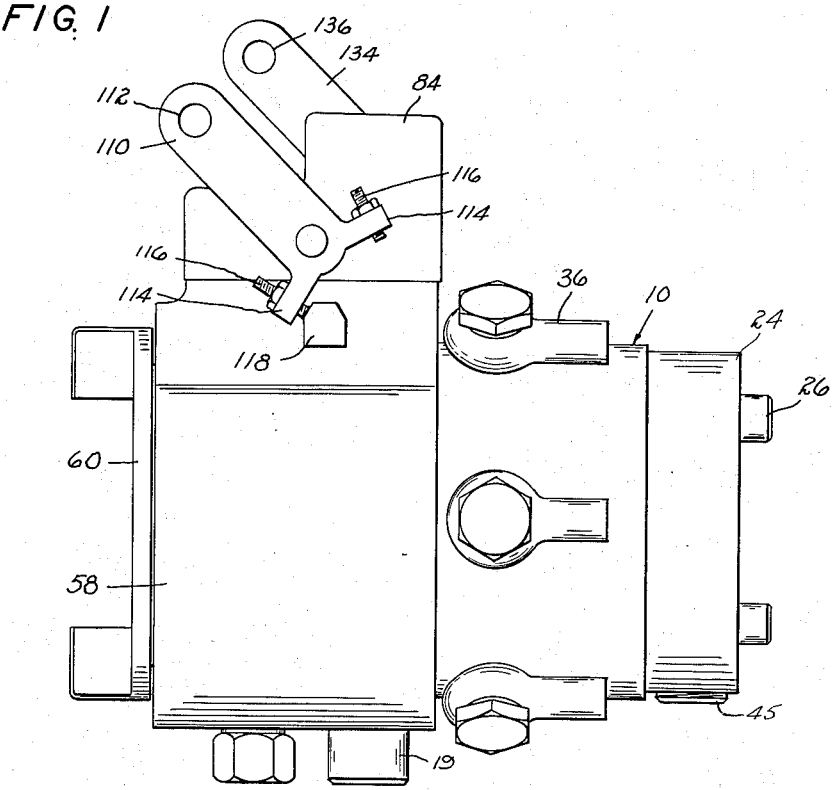
Fig. 1 is a side view of a fuel pump provided with a metering valve constructed in accordance with the invention.
Figure 2:
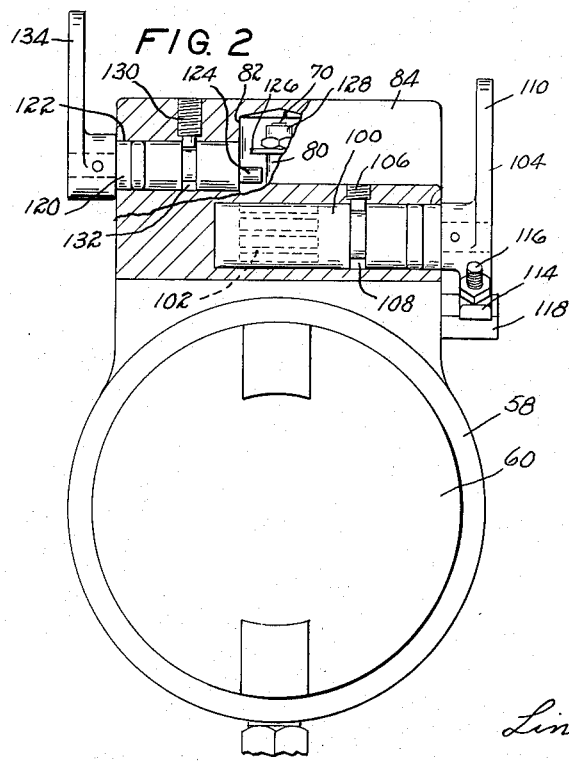
Fig. 2 is an end view of the pump partially in cross section to show portions of the valve control mechanism.
Figure 3:
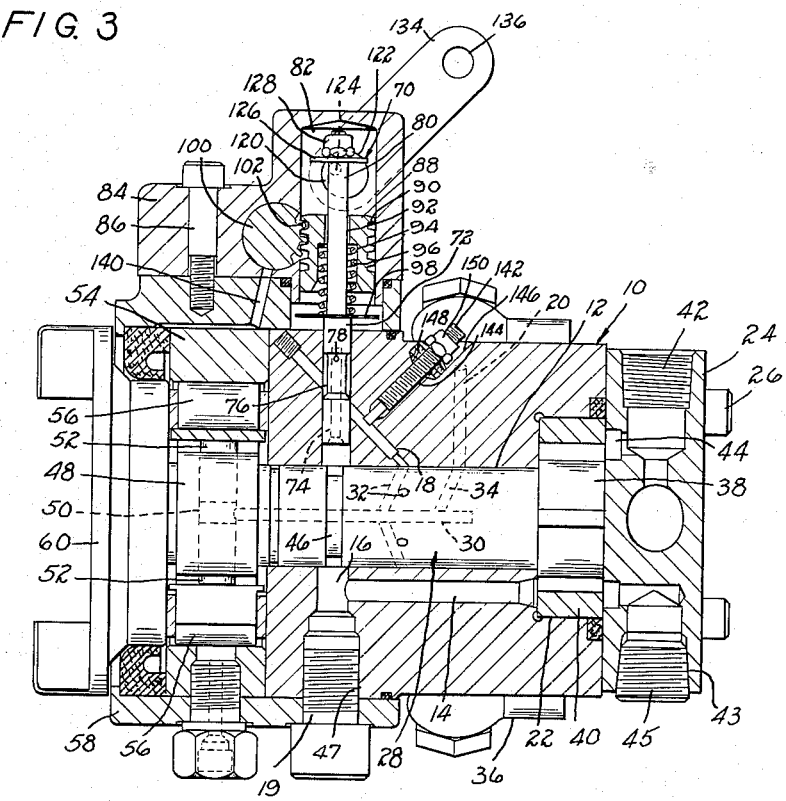
Fig. 3 is a longitudinal cross-sectional view of the pump with the valve in positive shut-off position.

For purposes of illustration, the metering valve of the present invention has been shown embodied in an exemplary fuel pump of the type disclosed and claimed in my co-pending application Ser. No. 767,939, filed August 11, 1947, now Patent No. 2,641,238, issued June 9, 1953. In the exemplary fuel pump shown in the drawings, there is provided a generally cylindrical pump body 10 having a relatively large axial opening or bore 12 and various smaller passageways or conduits 14, 16, 18 and 20. The righthand end of the body 10 as viewed in Figs. 1 and 3 is provided with an enlarged counterbore 22 which is covered by an end plate 24 fastened to the end of the body 10 by suitable means such as the bolts 26.

Disposed within the central bore 12 and rotatably mounted therein is a cylindrical fuel distributing member 28 having an axial passageway 30, a plurality of generally radially arranged uniformly spaced apart inlet openings 32 and an outlet opening 34. When the fuel distributing member 28 is rotated, the inlet openings 32 communicate in sequence with the adjacent orifice of the passageway 18. Also, following each communication of an inlet opening 32 with the passageway 18, the outlet opening 34 communicates with one of the outlet passageways 20 which are circumferentially arranged about the bore 12 and which communicate with nipples 36 on the exterior of the casing 10 and by means of which connections may be made to the various cylinders of the engine (not shown) to which the fuel is being pumped.

Disposed within the enlarged counterbore 22 is a fuel pickup pump or feed pump which, in the specific embodiment, is of the sliding vane type. The pump comprises a rotor 38 fixed to the end of the fuel distributing member 28 and adapted to rotate therewith, and a stator 40 disposed at the periphery of the counterbore 22. An inlet to the pickup pump is provided by threaded opening 42 and passageway 44 in the end plate 24. The outlet for the pickup pump is provided by the passageway 14 which extends between the counterbore 22 and the transverse passageway 16. In the event it is desired to establish communication between the outlet side of the pickup pump and the passageway exteriorly of the pump this may be effected by plugging the passageway 14 and establishing an external flow line (not shown) between threaded openings 43 and 47, the openings being closed in the illustration in the drawings by removable plugs 45 and 19, respectively.

The transverse passageway 16 intersects the central bore 12 and communication between opposite sides is established by a groove 46 in the fuel distributing member 28. The passageway 16 communicates with the diagonal passageway 18 whereby fuel pumped by the pickup pump is fed to the inlet openings 32 of the fuel distributing member 28.

On the end of the fuel distributing member 28, opposite from the pickup pump, is a charge pump which comprises a cylindrical member 48 of enlarged diameter having a transverse passageway 50 communicating with the axial passageway 30 of the fuel distributing member 28. Disposed within the transverse passageway 50 are opposed pistons 52 which are intermittently thrust inwardly as the fuel distributing member 28 is rotated, the actuation of the piston being effected by means of a stationary annular cam 54 which actuates the pistons 52 through intermediate rollers 56. The cam 54 is supported in a telescoping housing 58 extending over the lefthand end of the body 10 as viewed in Figs. 1 and 3 of the drawings. Fixed to the outer end of the cylindrical member 48 is a coupling 60 by means of which the fuel pump may be secured to a driving member such as the camshaft or drive shaft of the engine with which the fuel pump is associated. The configuration and arrangement of the cam 54 is such that the pistons 52 are permitted to move radially outwardly whenever one of the inlet openings 32 is in communication with the passageway 18 to permit a charge of fuel to enter the fuel distributing member and then, when the inlet openings 32 are moved beyond communication with the passageway 18 and the outlet opening 34 is brought into communication with an outlet port 20, the plungers will be moved inwardly to pump the charge of fuel to the particular engine cylinder with which communication is established.

The foregoing description is given merely by way of background and to assist in the understanding of the invention since the pump per se forms no part of the present invention. The invention is particularly concerned with the valve denoted generally at 70 which is disposed in the passageway 16 for regulating the flow of fuel to the passageway 18 and the control means for the valve.

Figure 4:
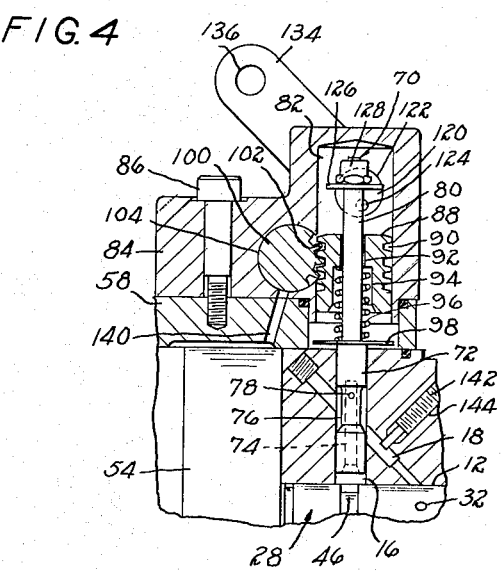
Fig. 4 is a fragmentary view in cross section showing the valve in metering position.

As best shown in Figs 3 and 4 of the drawings, the valve 70 comprises a cylindrical plunger 72 having an axial passageway 74 and an annular groove 76 communicating with the passageway 74 through an orifice 78. The metering effect of the valve 70 depends on the degree of registry of the annular groove 76 with the diagonal passageway 18. A partially open or metering position of the valve is shown in Fig. 4 of the drawings, while the shut-off position is shown in Fig. 3. In order to limit the maximum flow of the fuel through the valve 70, there is provided a threaded plunger 142 disposed in a tapped opening 144 extending at right angles to the transverse passageway 18. By adjusting the threaded plunger 142 inwardly and outwardly, the maximum flow through the passageway 18 may be selectively varied. The tapped opening 144 has a counterbore 146 at its outer end for receiving a conventional packing 148 and a locknut 150.

Fixed to the end of the plunger 72 and extending outwardly from the pump is a valve stem 80. The valve stem 80 is accommodated in a bore 82 formed in a block 84 bolted to the side of the housing 58, for example, by bolts 86. Mounted in the bore 82 and surrounding the valve stem 80 is a bushing 88 having circumferential grooves 90, a central bore 92 through which the valve stem extends, and an enlarged counterbore 94 in which is received a spiral spring 96 disposed about the valve stem 80. The inner end of the spiral spring 96 abuts against a plate 98 disposed at the juncture of the valve stem 80 and valve plunger 72.

As will be apparent, the compressive force exerted on the plunger 72 by the spring 96 will depend upon the axial position of the bushing 88. The axial position of the bushing 88 is controlled by a shaft 100 having circumferentially arranged teeth 102 meshing with the grooves 90, the shaft 100 being disposed in a transverse bore 104 and retained in operative position by means of a setscrew 106 engaging in the circumferential groove 108 in the shaft 100. The outer end of the shaft 100 extends outwardly from the block 84 and has fixed thereto a crank arm 110 provided with an opening 112 in its outer end for connection to a throttle or other actuating means (not shown). The crank arm 110 is provided with ears or lugs 114 carrying setscrews 116 which are adapted to engage against a stop member 118 for limiting pivoting movement of the shaft 100. As will be apparent, when the shaft 100 is pivoted in a counterclockwise direction to the position in Fig. 1 of the drawings, the pressure of the spring 96 will be reduced to a minimum, thus enabling the valve 70 to move radially outwardly under the influence of the fluid pressure in the transverse passageway 16, causing the effective passageway to be reduced to a predetermined minimum establishing the idling position of the pump. As the crankarm 110 is thrown to the right, causing the shaft 100 to be rotated in a clockwise direction, the amount of pressure on the spring 96 is increased, thus increasing the force on the valve 70, tending to move it inwardly against the fluid pressure in the passageway 16, thus increasing the effective opening of the valve. The position of the valve at any given moment is determined by the pressure of the spiral spring 96 and the fluid pressure in the passageway 16 acting upon the end of the valve. Accordingly the valve is responsive to fluid pressure and will operate to maintain a constant effective opening for any setting of the shaft 100, this for the reason that, as the fluid pressure increases tending to increase the rate of flow, then the effective opening is reduced and, conversely, when the fluid pressure drops, the valve tends to move in an opening direction, increasing the effective orifice.

When it is desired to completely shut off the valve, this may be accomplished by means of a shaft 120 extending through a transverse bore 122 in the block 84 and having at its inner end an eccentric pin 124 adapted to engage underneath a cap on the end of the valve stem formed by a washer 126 and the nut 128. The shaft 120 is supported against axial movement by means of a setscrew 130 extending into an annular groove 132 in the shaft 120. Fixed on the outer end of the shaft 120 is a crankarm 134 having an opening 136 at its outer end for connection to the shut-off control member or lever (not shown). When the crankarm 134 is in the position shown in Figs. 1 and 4 of the drawings, the eccentric pin 124 is sufficiently spaced from the washer 126 so that it will not interfere with the operation of the valve. However, when the crankarm 134 is thrown to the position shown in Fig. 3 of the drawings, the eccentric pin 124 forms a positive abutment which withdraws the valve 70 and maintains it in the full "off" position.

Since, during the normal operation of the pump, the fuel in the transverse passageway 16 is under pressure, and since there is sufficient clearance between the valve plunger 72 and the surface of the passageway 16 to permit the plunger to slide freely therein, there will be an escape of the fuel outwardly along the sides of the plunger to the bore 82, completely filling the same. This volume of oil disposed about the plate 98 effectively dampens movements of the valve 70 and prevents fluctuations or fluttering due to momentary pressure changes such as will occur because of the intermittent opening and closing of the outlet of the passageway 18 by the distributing member 28. A pressure relief passageway 140 is provided between the interior of the housing 58 and the bore 104 to return the excess oil which will leak around the bushing 88 and escape into the bore 104. This insures that the space in the bore 82 between the bushing 88 and the pump body will be filled with liquid while substantially eliminating leakage to the exterior. It also prevents pressure from building up in the bore 82 which would interfere with the normal operation of the valve.

It thus will be seen that there has been provided in accordance with the invention a metering valve of simple and economical structure which is efficient in operation and effective for its intended purpose of permitting simple and convenient manual control of the flow of fuel while at the same time compensating for variations in fuel pressure to insure a constant effective opening for a selected position of the valve.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for varying the amount of fuel delivered to the charge pump and thereby controlling the speed of the engine comprising a body having a passageway communicating with the feed pump and a metering outlet port in one side of the passageway communicating with the charge pump, a valve member movable endwise in said passageway for progressively increasing and decreasing the effective opening of said port depending upon the position of the valve member, said valve member having a surface subjected to the pressure of fuel in the passageway, a spring opposing movement of the valve in response to said pressure, means for variously positioning the valve member in said passageway comprising means for adjusting the force of the spring, and independent means for moving the valve member to port closing position against the bias of the spring.

2. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for varying the amount of fuel delivered to the charge pump and thereby controlling the speed of the engine comprising a body having a passageway communicating with the feed pump and a metering outlet port in one side of the passageway communicating with the charge pump, a valve member slidably mounted in said passageway for progressively decreasing the fuel flow through the port as the valve member is moved outwardly, said valve member having its inner end surface subjected to the pressure of fuel in the passageway, a spring opposing movement of the valve in response to said pressure, means for variously positioning the valve member in said passageway comprising means for adjusting the force of the spring, and independent means for moving the valve member outwardly of the passageway to port closing position.

3. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for varying the amount of fuel delivered to the charge pump and thereby controlling the speed of the engine comprising a body having a passageway communicating with each of the pumps, a valve member movable endwise in said passageway for progressively increasing and decreasing the fuel flow through the passageway depending upon the position of the valve member, said valve member having an end surface subjected to the pressure of fuel in the passageway, a spring opposing movement of the valve in response to said pressure, means for variously positioning the valve member in said passageway comprising means for adjusting the force of the spring, and means for damping movement of the valve member in either direction.

4. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for varying the amount of fuel delivered to the charge pump and thereby controlling the speed of the engine comprising a body having a passageway communicating with each of the pumps, a valve member movable endwise in said passageway for progressively increasing and decreasing the fuel flow through the passageway depending upon the position of the valve member, said valve member having an end surface subjected to the pressure of fuel in the passageway, a spring seat slidably mounted for movement toward and away from the valve member, a spring between the valve seat and the valve member opposing movement of the valve in response to said pressure, and means for variously positioning the valve member in said passageway comprising means for moving the spring seat.

5. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for varying the amount of fuel delivered to the charge pump and thereby controlling the speed of the engine comprising a body having a passageway communicating with each of the pumps, a valve member movably mounted in said passageway for progressively increasing and decreasing the fuel flow through the passageway depending upon the position of the valve member, said valve member having a surface subjected to the pressure of fuel in the passageway, a spring opposing movement of the valve in response to said pressure, means for variously positioning the valve member in said passageway comprising means for adjusting the force of the spring, and a second adjustable valve member for limiting the maximum flow through said passageway.

6. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating at one end with the feed pump and a metering outlet port in one side of the passageway communicating with the charge pump, a valve member movable endwise in said passageway across the outlet port for progressively increasing and decreasing the fuel flow through the outlet port depending upon the position of the valve member, said valve member having an end surface subjected to the pressure of fuel in the passageway, a spring opposing movement of the valve in response to said pressure, means for variously positioning the valve member in said passageway comprising means for adjusting the force of the spring, means forming a fuel collecting chamber spaced from the outlet port and means on the valve member extending into the chamber for damping movement of the valve member.

7. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating at one end with the feed pump and a metering outlet port in one side of the passageway communicating with the charge pump, a valve member movable endwise in said passageway across the outlet port for progressively increasing and decreasing the fuel flow through the outlet port depending upon the position of the valve member, said valve member having an end surface subjected to the pressure of fuel in the passageway, a spring opposing movement of the valve in response to said pressure, means for variously positioning the valve member in said passageway comprising means for adjusting the force of the spring, means forming a fuel collecting chamber spaced from the outlet port and having a pressure relief opening, and means on the valve member extending into the chamber for damping movement of the valve member.

8. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating at one end with the feed pump and a metering outlet port in one side of the passageway communicating with the charge pump, a valve member movable endwise in said passageway across the outlet port for progressively increasing and decreasing the fuel flow through the outlet port depending upon the position of the valve member, said valve member having a surface subjected to the pressure of fuel in the passageway, a spring opposing movement of the valve in response to said pressure, means for variously positioning the valve member in said passageway comprising means for adjusting the force of the spring, means forming a fuel collecting chamber spaced from the outlet port, and a damping element in said chamber attached to the valve member and having opposite surfaces immersed in the fuel in said chamber.

9. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating at one end with the feed pump and a metering outlet port in one side of the passageway communicating with the charge pump, a valve member movable endwise in said passageway for progressively increasing and decreasing the fuel flow through the outlet port depending upon the position of the valve member, said valve member having a surface subjected to the pressure of fuel in the passageway, a spring opposing movement of the valve in response to said pressure, means for variously positioning the valve member in said passageway comprising means for adjusting the force of the spring, means forming a fuel collecting chamber at the end of the passageway opposite from said one end, and a vane in said chamber attached to the valve member and extending transversely of the path of movement of the valve member.

10. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating with each of the pumps, a valve member movable endwise in said passageway for progressively increasing and decreasing the fuel flow through the passageway depending upon the position of the valve member, said valve member having an end surface subjected to the pressure of fuel in the passageway, a spring seat slidably mounted for movement toward and away from the valve member, a spring between the valve seat and the valve member opposing movement of the valve in response to said pressure, and means for variously positioning the valve member in said passageway comprising actuating means extending transversely of the passageway and operable from the exterior of the valve for moving the spring seat.

11. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating with each of the pumps, a valve member movable endwise in said passageway for progressively increasing and decreasing the fuel flow through the passageway depending upon the position of the valve member, said valve member having an end surface subjected to the pressure of fuel in the passageway, a bushing slidably mounted for movement toward and away from the valve member, said bushing having transverse grooves in its outer surface, a spring between the bushing and the valve member opposing movement of the valve in response to said pressure, and means for variously positioning the valve member in said passageway comprising a rotatable shaft having teeth engaging in said grooves.

12. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating with the feed pump and a metering orifice in one side of the passageway communicating with the charge pump, a valve member movable endwise in said passageway for progressively increasing and decreasing the fuel flow through the metering orifice depending upon the position of the valve member, said valve member having an end surface subjected to the pressure of fuel in the passageway, a spring seat slidably mounted for movement toward and away from the valve member, a spring between the valve seat and the valve member opposing movement of the valve in response to said pressure, means for variously positioning the valve member in said passageway comprising means for moving the spring seat, a stem on said valve member extending through an opening in said valve seat, and means engageable with the valve stem for moving the valve member to position for closing the metering orifice.

13. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating at one end with the feed pump and a metering outlet port in one side of the passageway communicating with the charge pump, a valve member movable endwise in said passageway for progressively increasing and decreasing the fuel flow through the outlet port depending upon the position of the valve member, said valve member having a surface subjected to the pressure of fuel in the passageway, a spring seat mounted for movement toward and away from the valve member and having a central opening, a spring disposed between the spring seat and valve member opposing movement of the valve in response to said pressure, means for variously positioning the valve member in said passageway comprising means for adjusting the position of the spring seat, a valve stem on said valve member extending outwardly through the opening in said bushing, and eccentric means engageable with the stem for moving the valve to port closing position.

14. In a fuel injection system for internal combustion engines of the type comprising a charge pump driven by the engine and supplying fuel to the engine and a feed pump driven by the engine for supplying fuel to the charge pump, a fuel metering valve disposed between the charge and feed pumps for controlling the speed of the engine comprising a body having a passageway communicating at one end with the feed pump and a metering outlet port in one side of the passageway communicating with the charge pump, a valve member movable endwise in said passageway for progressively increasing and decreasing the fuel flow through the outlet port depending upon the position of the valve member, said valve member having a surface subjected to the pressure of fuel in the passageway, a bushing mounted for movement toward and away from the valve member having grooves in its outer surface, a spring between the valve member and bushing opposing movement of the valve in response to said pressure, a housing forming a fuel collecting chamber at the end of the passageway opposite from said one end, a rotatable shaft extending into the chamber through a bore in the housing, said shaft having teeth engaging the grooves of said bushing, and a pressure relief opening communicating with the bore.

15. In a fuel injection system for internal combustion engines, a charge pump driven by the engine and supplying fuel to the engine cylinders, a feed pump driven by the engine for supplying fuel to the charge pump under pressure responsive to engine speed, means forming a feed passageway between the feed pump and charge pump, a movable valve in the passageway for varying the fuel flow in the passageway and having a surface subjected to the pressure of fuel supplied to the passageway by the feed pump, a spring operatively connected to the valve for opposing movement of the valve responsive to fuel pressure, and means movable relative to the valve for adjusting the force of the spring.

16. In a fuel injection system for internal combustion engines, a charge pump driven by the engine and supplying fuel to the engine cylinders, a feed pump driven by the engine for supplying fuel to the charge pump under pressure responsive to engine speed, means forming a valve chamber having an inlet communicating with the feed pump and a metering outlet port in the side of the valve chamber communicating with the charge pump, a plunger in the chamber movable across the outlet port to vary the effective opening thereof, and means for positioning the plunger relative to the outlet port to control the speed of the engine comprising a surface on the plunger subjected to the pressure of fuel supplied to the inlet by the charge pump, a spring connected at one end to the plunger for opposing movement of the plunger responsive to fuel pressure, and a retainer for the other end of the spring movable relative to the chamber and plunger.

References Cited in the file of this patent

UNITED STATES PATENTS

| | | |
|---|---|---|
| 469,611 | Tully | Feb. 23, 1892 |
| 1,357,837 | Bouvier | Nov. 2, 1920 |
| 1,609,472 | Heil et al. | Dec. 7, 1926 |
| 1,611,079 | Roschanek | Dec. 14, 1926 |
| 2,193,270 | Coleman | Mar. 12, 1940 |
| 2,222,919 | Trapp | Nov. 26, 1940 |
| 2,364,812 | Pierson | Dec. 12, 1944 |
| 2,372,456 | Stewart | Mar. 27, 1945 |
| 2,447,265 | Beardsley | Aug. 17, 1948 |
| 2,465,784 | Berlyn et al. | Mar. 29, 1949 |

FOREIGN PATENTS

| | | |
|---|---|---|
| 591,599 | Great Britain | Aug. 22, 1947 |
| 837,572 | France | Feb. 14, 1939 |